(12) United States Patent
Artigalas et al.

(10) Patent No.: US 6,629,196 B2
(45) Date of Patent: *Sep. 30, 2003

(54) METHOD AND DEVICE FOR OBTAINING AN ADAPTIVE SELECTION OF SETS OF DATA STORED IN A MASS MEMORY

(75) Inventors: Max Artigalas, Le Chesnay (FR); Paul-Louis Meunier, Paris (FR)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,343

(22) Filed: Apr. 6, 1998

(65) Prior Publication Data
US 2003/0051095 A1 Mar. 13, 2003

(30) Foreign Application Priority Data
Apr. 16, 1997 (FR) ............................................. 97 04688

(51) Int. Cl.$^7$ ............................................. G06F 12/00
(52) U.S. Cl. ........................................ 711/111; 711/154
(58) Field of Search ................. 711/111, 122, 711/143, 112, 154, 133–136, 159–161

(56) References Cited

U.S. PATENT DOCUMENTS

| | | | | |
|---|---|---|---|---|
| 4,077,059 A | * | 2/1978 | Cordi et al. ................. | 711/122 |
| 4,442,487 A | * | 4/1984 | Fletcher et al. .............. | 711/122 |
| 4,703,465 A | | 10/1987 | Parker ......................... | 369/30 |
| 5,157,643 A | | 10/1992 | Suzuki ......................... | 369/33 |
| 5,325,370 A | * | 6/1994 | Cleveland et al. ........... | 714/755 |
| 5,369,753 A | * | 11/1994 | Tipley ......................... | 711/122 |
| 5,592,432 A | * | 1/1997 | Vishlitzky et al. ...... | 365/230.03 |
| 5,819,105 A | * | 10/1998 | Moriarty et al. ................ | 710/5 |
| 6,182,191 B1 | * | 1/2001 | Fukuzono et al. ........... | 711/111 |

FOREIGN PATENT DOCUMENTS

| | | |
|---|---|---|
| EP | 0346979 A2 | 12/1989 |
| EP | 0626689 A2 | 11/1994 |
| JP | 4-221489 * | 8/1992 |

OTHER PUBLICATIONS

Patent Abstracts of Japan, vol. 018, No. 689 (P–1850), Dec. 26, 1994 & JP 06 274187 A (Shinji Murase), Sep. 30, 1994.
Patent Abstracts of Japan, vol. 095, No. 010, Nov. 30, 1995, & JP 07 191683 A (Citizen Watch Co. LTD.), Jul. 28, 1995.
French Search Report.

* cited by examiner

Primary Examiner—Matthew Kim
Assistant Examiner—Matthew D. Anderson
(74) Attorney, Agent, or Firm—Joseph S. Tripoli; Paul P. Kiel

(57) ABSTRACT

The invention relates to a method and device for obtaining an adaptive selection of sets of data stored in a mass memory. The method and device use administrative information stored in a administration memory and related to the data sets, and allow to obtain a classified list of data sets. The adaptive selection may reflect habits of access to the sets of data by a user as well as momentary preferences of the user.

10 Claims, 6 Drawing Sheets

Figure 1:
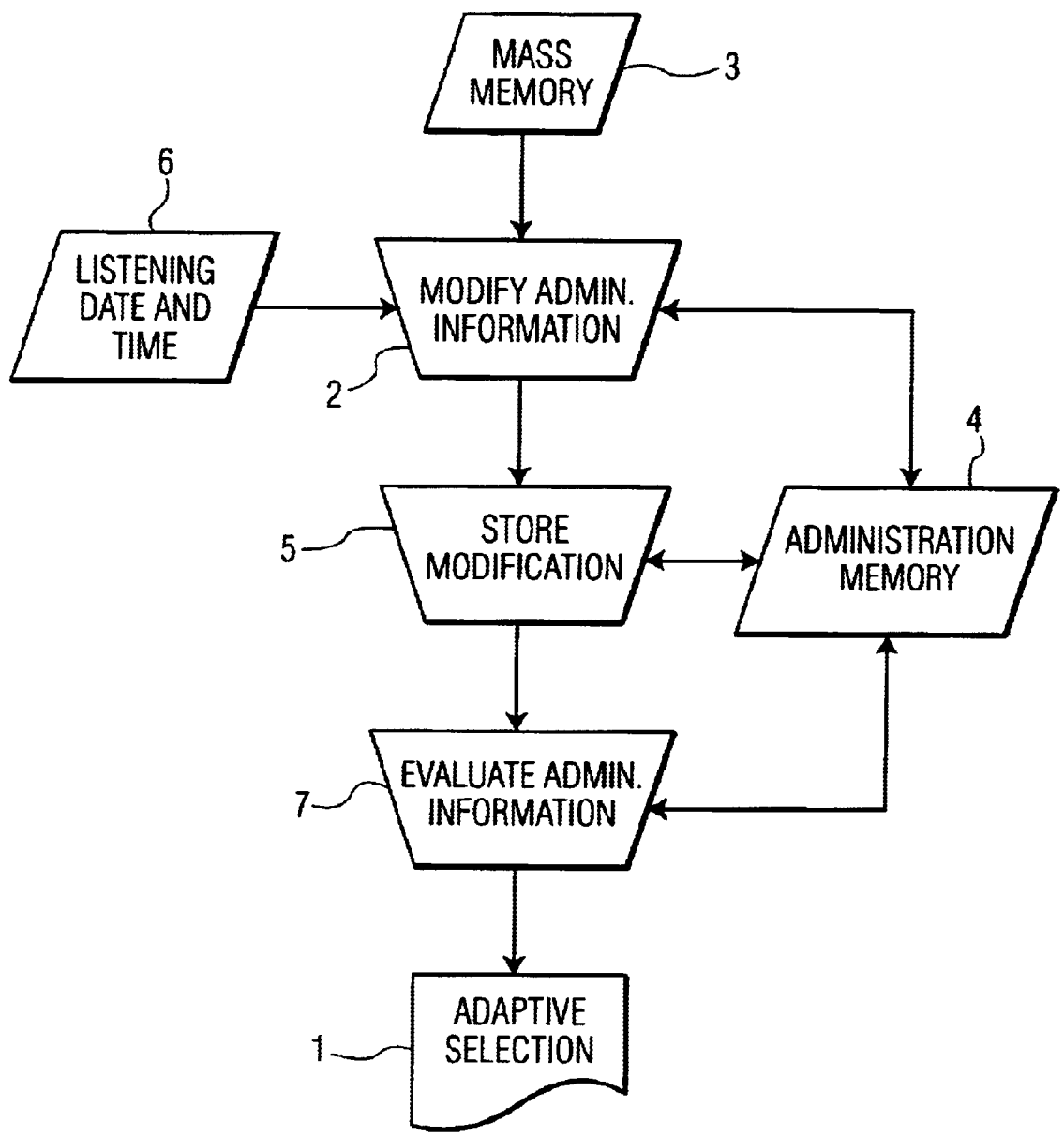

METHOD AND DEVICE FOR OBTAINING AN ADAPTIVE SELECTION OF SETS OF DATA STORED IN A MASS MEMORY

The present invention relates to a method for obtaining an adaptive selection of sets of data stored in a mass memory. The method makes use of administration information related to the sets of data and allows to obtain a classified list of sets of data. The present invention also relates to a device for obtaining an adaptive selection of sets of data stored in a mass memory.

A mass memory is a memory which allows to store relatively large quantities of data. A mass memory may concretely be embodied in various forms, notably in form of semi-conductor circuits, holographic memories (memory with linear, surface or volume density), magnetic carriers or also so called optical carriers, rewritable or not.

The capacities of mass memories, i.e. the quantity of the storable data amount, haven't ceased to increase in the last years, due among other reasons to the miniaturization of the semi-conductor circuits or also to the increasing density of information storable on various carrier. The increasing of the memory capacities has brought to a user of these memories the problem of administrating and of accessing to the numerous data contained in these memories. Therefore a mass memory in form of an optical disk may contain numerous data grouped in sets, for example songs to which a user will in a normal case access in a sequential order. The user activates a function <<read>> of an optical disk reader which accesses the songs and reproduces them in a predetermined order which will generally be a fixed order contained in a directory. Thus the user listens and listens again to the songs in the same order every time he activates the function <<read>>.

In a case where the user chooses not wanting to listen for example to the first song, he manually selects to access any other song contained in the directory by activating once or many times a function <<next song>>. The users may have to listen to the beginning of a plurality of songs before finding a wanted song and also for every new song to be listened.

Some selection devices allow a user to select in advance but in a fixed manner a list of songs prior to each listening session. These devices are commonly known as programming devices.

The selection of the songs may become a laborious and long task when the memory contains a large number of songs, for example 1.000 songs.

The present invention suggests to overcome the difficulty of selecting sets of data in mass memories which have relatively large capacities. More precisely the difficulty lies in the number of the user's interventions which increases with the number of sets of data and as a consequence in the time which the user spends to select these sets of data. Furthermore the user needs to know the approximate or precise nature of the set of data which he wants to select, this becoming difficult or even impossible when the number of these sets increases in a mass memory.

A solution to the described difficulty of selecting is according to the present invention found in a method for obtaining an adaptive selection of sets of data contained in a mass memory. The method comprises the steps of modifying administration information of a set of data at least when this set is modified, erased or read, storing the modified administration information in an administration memory, evaluating at least a part of the administration information according to predetermined criteria and obtaining an adaptive selection of the corresponding sets of data.

The method for obtaining an adaptive selection allows to take in account habits of accessing to sets of data by a user and/or temporary preferences of this user in order to perform in an automatic manner a selection of these sets of data. Therefore when the sets of data are songs or movie sequences, the adaptive selection allows to recall an ambiance by initiating specific emotions of the user.

According to a preferred embodiment of the invention the method for obtaining an adaptive selection further foresees to modify new administration information of a new set of data contained in a temporary memory distinct from the mass memory at least when this new set is modified, erased or read. The new modified information is stored in the administration memory and evaluated according to a predetermined criteria of interest for obtaining an actual selection of the corresponding new sets of data. The new sets of data of the actual selection are transferred from the temporary memory to the mass memory.

When a user of sets of data receives a large number of new sets of data, these are not immediately stored in the mass memory. The method allows to keep among the new sets only those to which the user accesses according to predetermined criteria of interest before copying the selected new sets in the mass memory.

According to a preferred embodiment of the invention, the method for obtaining an adaptive selection comprises a step of classifying the sets of data of the adaptive selection in a predetermined hierarchical order such to obtain a classified list of these sets.

The predetermined hierarchy may for example be related to the number of times a user will have accessed to each set of data in a precise period of time.

Another problem which the present invention suggests to overcome is the improvement of the arrangement of the sets of data in the mass memory. The arrangement notably plays a role when the sets of data are sequentially stored and when certain sets of data are used more importantly than others.

As a solution to the other problem, the present invention is a method of arranging sets of data in which the sets of data contained in a mass memory are sequentially arranged and comprising the steps of obtaining a classified list of at least a part of the sets of data through a method for obtaining an adaptive selection and sequentially arranging in the mass memory the sets of the classified list according to the predetermined hierarchical order.

A solution to the described difficulty of selecting may according to the present invention also be seen in a device for an adaptive selection to select sets of data contained in a mass memory, the mass memory being at least readable using a first reading device. The device comprises at least a rewritable administration memory which contains information to administrate the sets of data. The device further comprises means for modifying the administration information of a set of data at least when this set is modified, erased or read, means for storing modified administration information in the administration memory, evaluating means for evaluating administration information according to one or many predetermined criteria and memorizing means for memorizing an adaptive selection of sets of data obtained using the evaluation means.

According to a preferred embodiment of the invention, the device comprises a temporary memory containing new sets of data, means for reading the new sets of data in the temporary memory, means for modifying new administration information of a new set at least when this new set is modified, erased or read, means for storing the modified new administration information in the administration memory, evaluating means for evaluating new administration information according to one or many predetermined criteria of interest in order to obtain an actual selection of new sets of data and transfer means for copying new sets of data out of the actual selection from the temporary memory into the mass memory.

At first the new sets of data are stored in a temporary manner. Next and depending on the interest which a user has for some of these new sets, these new sets are selected and copied in the mass memory. This way the mass memory isn't cluttered with sets of data which are of no interest for the user.

According to another preferred embodiment of the invention the mass memory, the temporary memory and the administration memory are on a same information carrier.

According to another preferred embodiment of the invention, the mass memory is on a sequential information carrier on which the sets of data are laid out sequentially.

The sequential information carrier may for example be a magnetic tape.

According to another preferred embodiment of the invention, the device for an adaptive selection comprises means for selecting one or many predetermined criteria.

The predetermined criteria may be of different kinds. A user chooses the appropriate criteria according to the circumstances of his environment.

According to another preferred embodiment of the invention, the device for an adaptive selection comprises a plurality of administration memories and means to choose one of these administration memories in a way such that the means for modifying, the means for storing and the evaluating means act on the administration information of the chosen administration memory.

The device for selecting allows in this way for a plurality of users to use sets of data contained in a same mass memory, each using its own administration memory.

According to another preferred embodiment of the invention the device for selecting comprises means to form into a hierarchy administration information of the sets of data contained in the adaptive selection in order to obtain a classified list of these sets.

As a solution to the other described problem the present invention proposes a device for arranging sets of data having means for arranging the sets of data sequentially on the sequential information carrier. The device for arranging comprises a device for an adaptive selection, a reorganization memory distinct from the mass memory, means for copying data from the mass memory into the reorganization memory and the other way round and means for arranging sets of data on the information carrier in a sequential order corresponding to an order of the sets of data in the classified list.

The device for selecting and the device for arranging may each be included in a player/recorder of the mass memory in order to ease the access to sets of data contained in a mass memory for a user.

Figure 2:
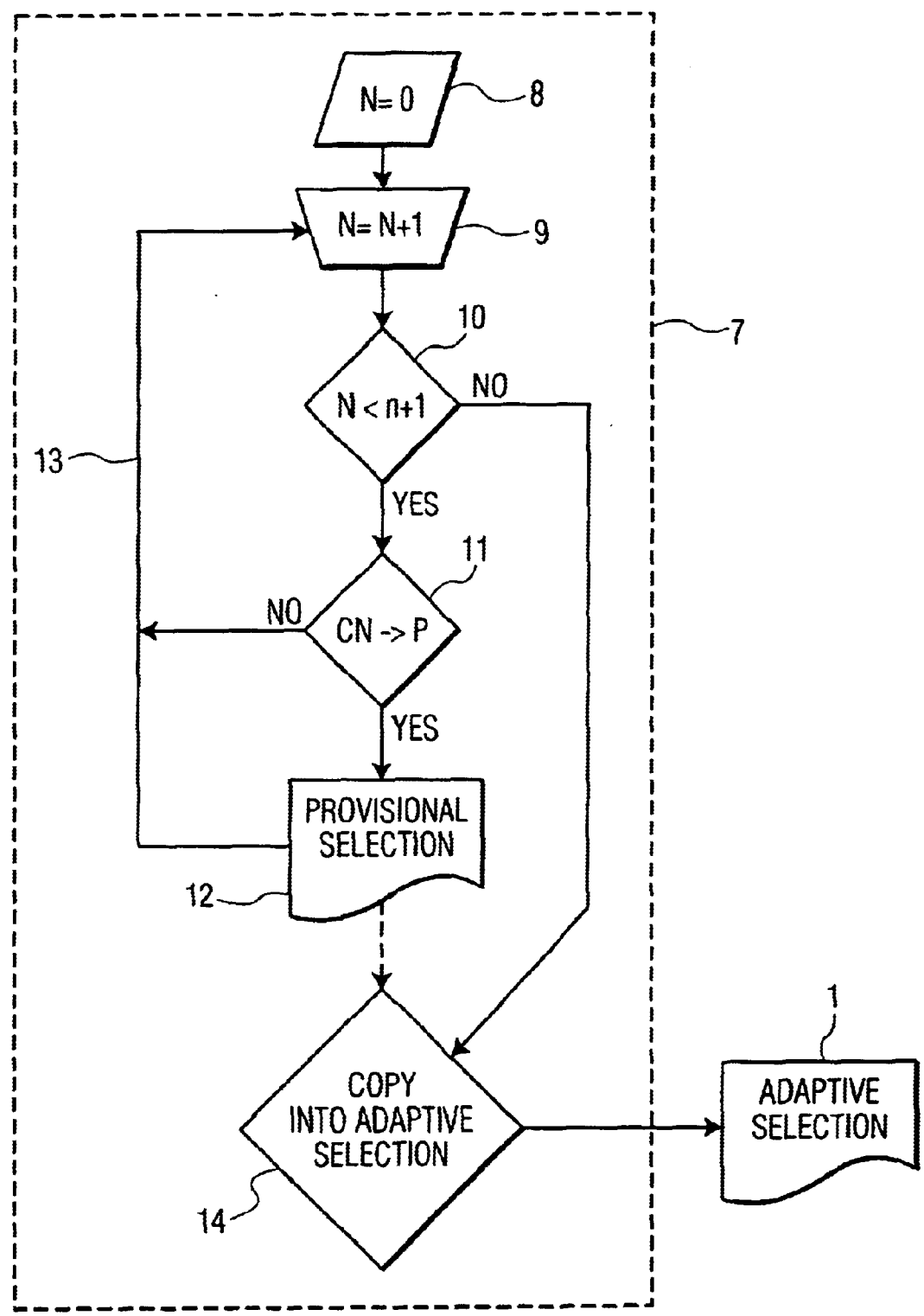
Figure 3:
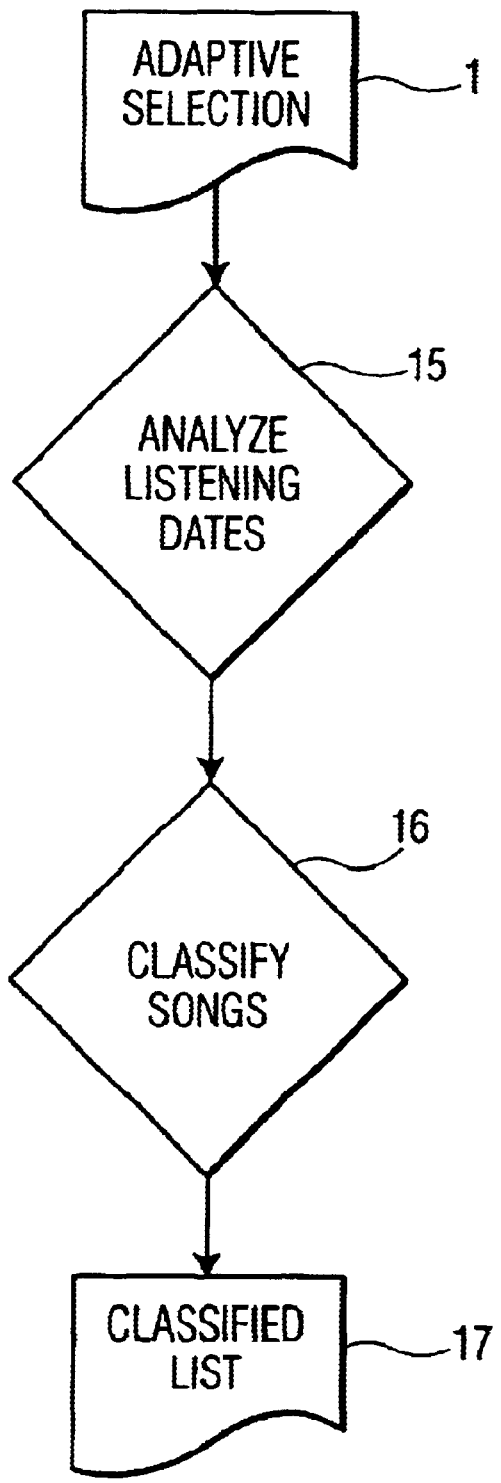
Figure 4:
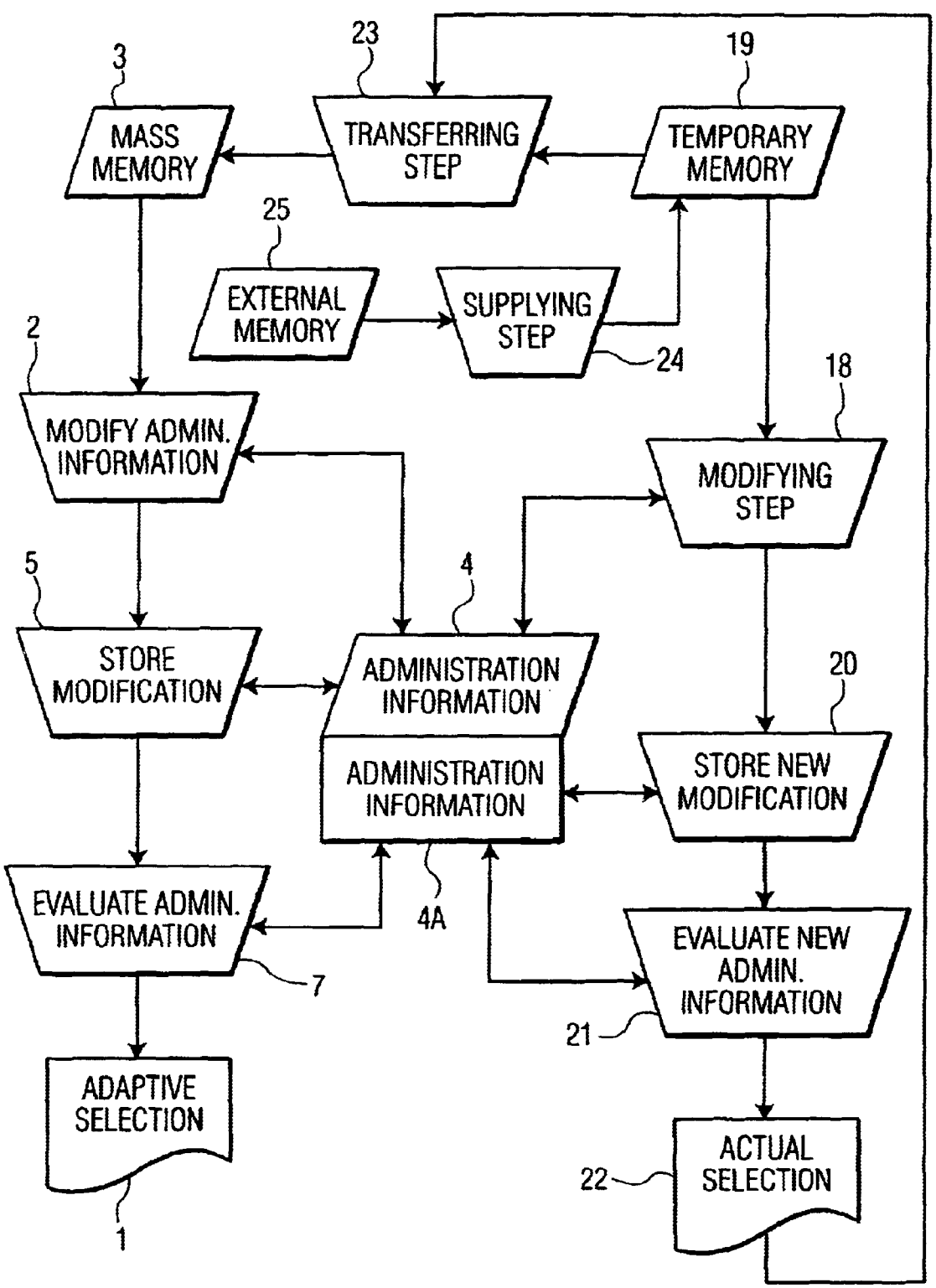
Figure 5:
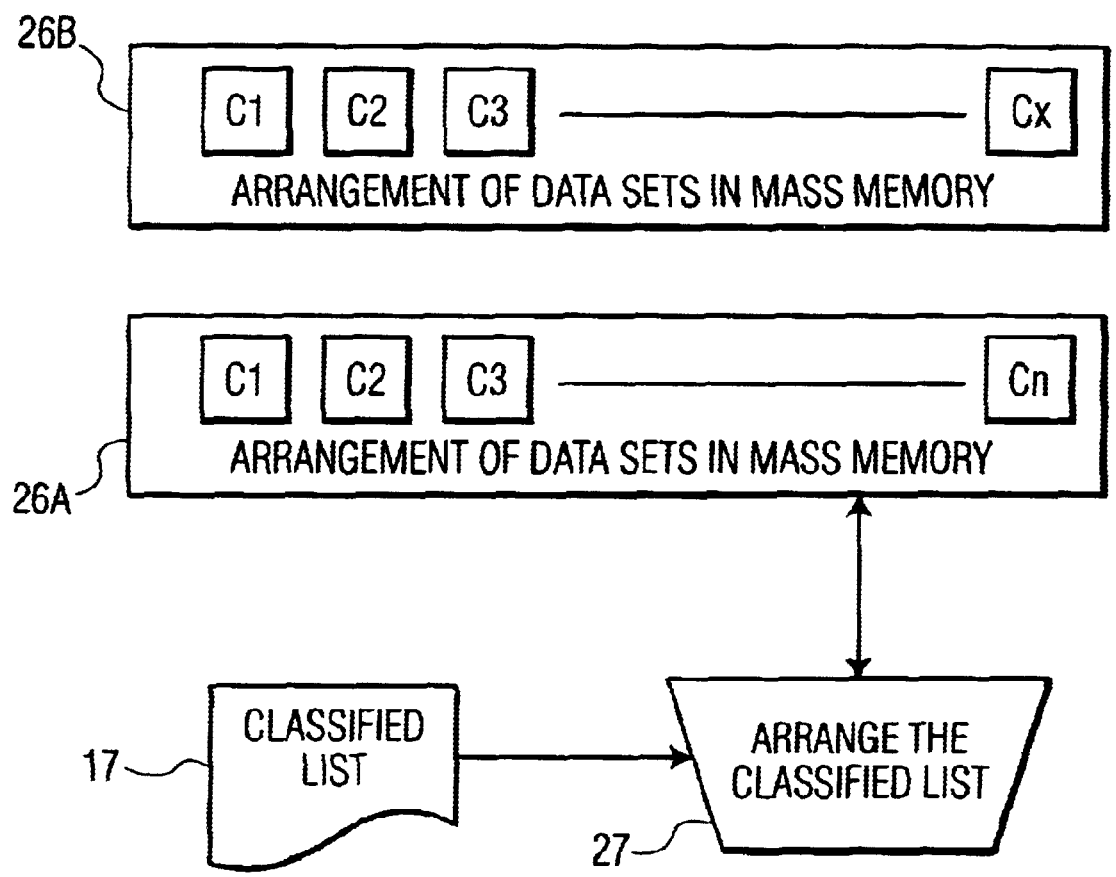
Figure 6:
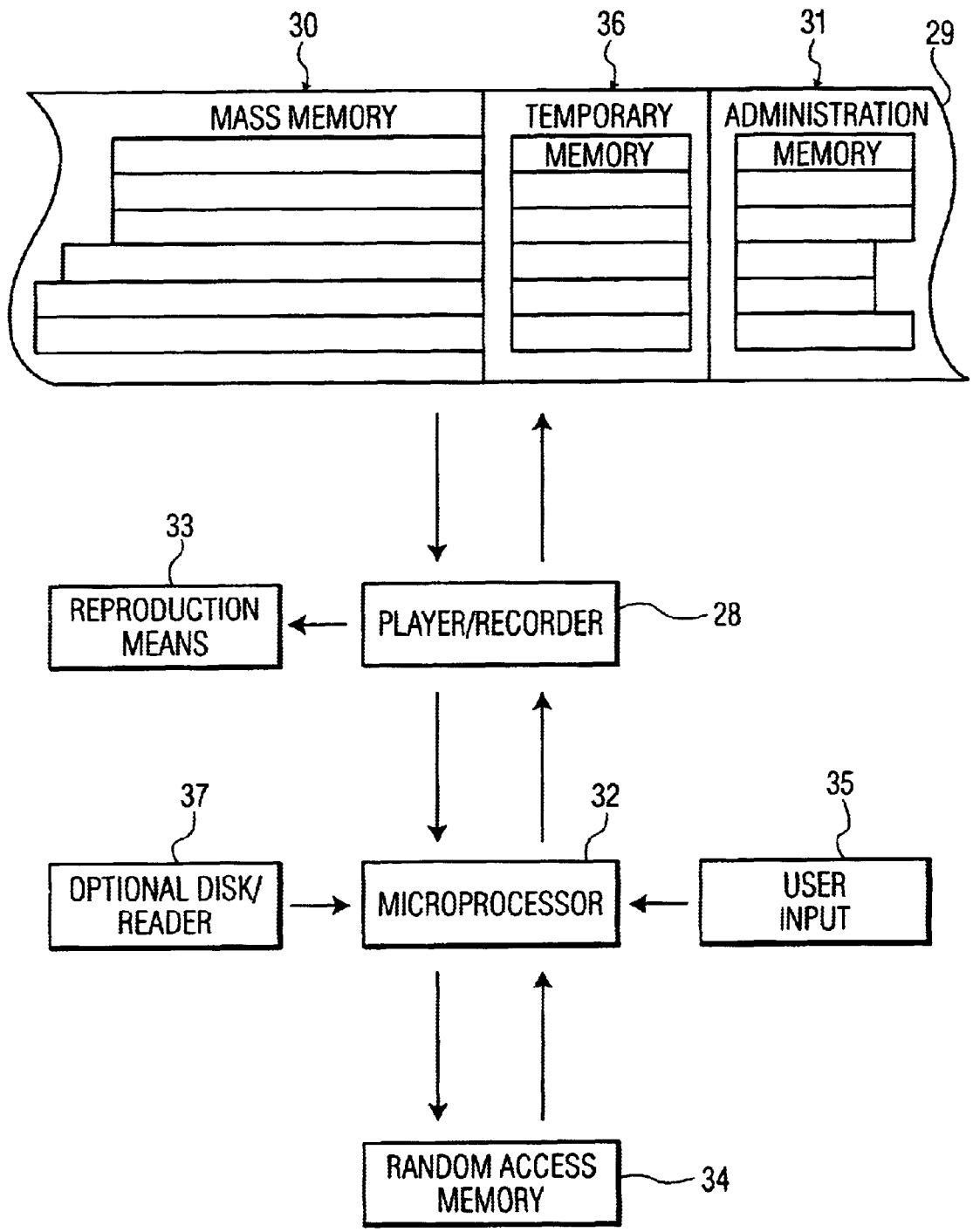

Other characteristics and advantages of the present invention will appear on reading the following description of examples complying to the present invention, the description being made with reference to figures appended in which:

the FIG. 1 contains an organization chart of a method for obtaining an adaptive selection;

the FIG. 2 contains an organization chart of an evaluating step from the method for obtaining and adaptive selection according to the invention;

the FIG. 3 contains an organization chart illustrating a step of a classifying from the method for obtaining an adaptive selection according to the invention;

the FIG. 4 contains an organization chart illustrating an embodiment of the method for obtaining an adaptive selection according to the invention;

the FIG. 5 schematically illustrates a method for arranging sets of data in a mass memory;

the FIG. 6 schematically shows a device for obtaining an adaptive selection.

For simplifying the description the same elements carry the same references in all figures. It is obvious that the described examples are given to explain and illustrate the present invention and do not establish any limitation of the present invention.

The FIG. 1 illustrates a sequence of steps to be done in a method for obtaining an adaptive selection according to the present invention. The method for obtaining an adaptive selection 1 modifies in a step 2 administration information related to a set of data which is contained in a mass memory 3 at least every time this set of data is modified, erased or read. As an example the sets of data may be songs stored in a mass memory and the songs are numbered from C1 to Cn as is shown in table 1 hereunder.

TABLE 1

| | Information to administrate the sets of data | | | |
|---|---|---|---|---|
| | | | Parametrical Info | |
| | Predetermined-info | | Listening | Listening |
| Song Nber | Type | Year | Date | Time |
| C1 | A | 1992 | 01.02.1997 | 9:00 |
| | | | 01.02.1997 | 18:34 |
| | | | 04.02.1997 | 19:00 |
| C2 | A | 1975 | 21.12.1996 | 15:00 |
| | | | 12.02.1997 | 15:00 |
| C3 | B | 1975 | 08.02.1997 | 9:30 |
| — | — | — | 09.02.1997 | 21:00 |
| — | — | — | | |
| — | — | — | | |
| Cn | | | | |

Every song C1, . . . ,Cn has corresponding administration information, the latter comprising predetermined information and parametrical information. The modified administration information is stored in an administration memory 4 during a storing 5.

The predetermined information may for example be indications on the type of the song (A, B, . . . ) and/or on the year of publication of the song (1975, 1992, . . . ). The predetermined information generally are for each song constants which may be attributed to the song, for example when the song is initially stored in the mass memory (step not shown in the FIG. 1). This does not rule out that the predetermined information may be modified at a later time by intervening on the storing 5, for example by attributing to a song which previously had the type A a new type B. Generally the predetermined information does not vary depending on an access to sets of data by a user for reading them.

The parametrical information related to a song depends on the access to this song by a user, notably for reading it; they may for example be listening dates and times at which an access to the song has been done. The parametrical information varies each time that a song in the mass memory is read and as a consequence it must be updated by using the step of modification 2.

The listening dates and times presented in the table 1 are fictive and chosen only to explain how the progress of the method for obtaining an adaptive selection works.

An update of the parametrical information contained in the administration memory 4 is done at the reading of a song C1, . . . ,Cn. At the time of reading, a listening date and time 6 for a song C1, . . . ,Cn are determined. This way the parametrical information concerning the listening date and time of a song C1, . . . ,Cn are modified and subsequently stored in the administration memory 4; for example a line of table 1 corresponding to the song C1 contains pairs of information on listening date/time according to which the song has been listened to on Feb. 1, 1997 at 9:00 o'clock and at 18:34 o'clock, and on Feb. 4, 1997 at 19:00 o'clock.

In order to limit the amount of parametrical information stored in the administration memory 4, for reasons of capacity of this administration memory, it is possible to limit a number of information pairs on listening date/time for each song to a maximum value; as soon as this maximum value is reached for a song and a new information pair date/time must be stored for this song, the most dated listening date/time information pair for this song is first erased in the storing step 5 to allow for the new information pair to be stored during the same storing step 5.

An evaluating 7 of the administration information may be done after each storing step 5 for each time that this appears to be necessary. The evaluating 7 of the administration information allows to obtain the adaptive selection 1 of the sets of data. The adaptive selection 1 may later be used to indicate to a reading device of the mass memory (not shown) which songs C1, . . . ,Cn have to be read and reproduced.

The evaluating 7 is done according to predetermined criteria that may be of very different kinds. A possible example for a predetermined criteria is the fact that a song C1, . . . ,Cn has been listened to in a predetermined period of time P.

An example of evaluating 7 is illustrated by an organization chart in the FIG. 2. The evaluating 7 consists in analyzing the parametrical information concerning the listening date for each song such to choose the songs which have been listened to in the predetermined period of time P. In order do this, an index N is set to the value 0 in an initialization step 8 and the value of the index N is incremented by 1 in an incrementing step 9. The index N is compared in a comparing step 10 with the number n of songs contained in the mass memory (not shown). In case the index N is smaller or equal to n an analyzing step 11 of the listening date of the song CN is done to determine if the song CN has been listened to in the predetermined period of time P. In the affirmative, the song CN is chosen and added to a provisional selection 12, and the index N is incremented by 1 in the incrementing step 9 at the exit of a loop 13. In the opposite case, i.e. when the song CN has not been listened to in the predetermined period of time P the incrementing step 9 is done immediately at the exit of the loop 13. If the comparing step 10 reveals that the index N has a value greater than small n then the provisional selection 12 is copied into the adaptive selection 1 by a copying step 14.

The FIG. 3 illustrates steps 15 and 16 which allow to classify in a hierarchical order the song contained in the adaptive selection 1. The hierarchical order may for example correspond to an order of values FC1, . . . ,FCn of listening frequencies for the song C1, . . . ,Cn in the predetermined period of time P.

The step 15 consists in analyzing listening dates of the songs out of the adaptive selection 1 in order to determine a number of times at which each song CN has been listened to in the predetermined period of time P, dividing for each song this number by a number of days comprised in the period of time P and obtaining the values FC1, . . . ,FCn of the listening frequencies.

The following step 16 allows to classify the songs of the adaptive selection 1 according to their values FC1, . . . ,FCn and results in a classified list 17 of songs.

The step 15 illustrated in the FIG. 3 and applied to songs contained in the table 1 will for a period P from the 1st to the 12th of February 1997 of 12 days deliver values of listening frequencies $FC1=3/12$, $FC2=1/12$, $FC3=2/12$, . . . ,FCn. By classifying in the step 16 the corresponding songs in a decreasing order of their listening frequency one obtains for C1, C2, and C3 the classified list [C1, C3, C2].

Other predetermined criteria may be applied during an evaluating 7. For example another predetermined criteria would be a defined range of listening times in which the songs have been listened to. For an example case in which this range covers the listening times comprised between 8:00 and 10:00 o'clock, only the songs C1 and C3 out of the table 1 are selected.

In another embodiment of the evaluating 7 a plurality of predetermined criteria are combined. For example at first the listening criteria for the song in a predetermined period of time P is applied and subsequently the criteria of the range of listening times.

In case the predetermined criteria which have been applied during the evaluating 7 apply to parametrical information the adaptive selection reflects a behavior which a user has had while listening to the songs during a past period of time. For this reason, it is advantageous that for a mass memory 3 used and read by a particular user, an administration memory 4 which is specific to this particular user be used.

It would also be possible to apply a predetermined criteria to evaluate the predetermined information. For example, the criteria might be the type (A, B, . . . ) of a song. A combination of predetermined criteria which may be applied to predetermined information and to paramatrical information would be a possibility to better take in account a behavior of a user.

The FIG. 4 illustrates a sequence of steps of a method for obtaining an adaptive selection which comprises the steps showed in the FIG. 1 and a modifying step 18 in which new administration information related to new sets of data contained in a temporary memory 19 distinct from the mass memory 3 are modified at least when a new set is modified, erased or read. A storing step 20 allows to store the new modified information into the administration memory 4. The new sets of data may for example be new songs which a user wants to discover.

The new administration information are modified in the modifying step 18 each time that the content of the temporary memory 19 is modified but also when a user accesses a new song in the temporary memory 19 to read and listen to it. The new administration information is evaluated in an evaluating step 21 according to predetermined criteria of interest. A predetermined criteria of interest may for example be seen in a listening frequency of a new songs during a precise period of time. So it is that the new songs frequently listened to during the precise period of time become subject of an actual selection 22 of new songs. The new songs of the actual selection 22 are copied from the temporary memory 19 into the mass memory 3 in a transferring step 23. In case where the temporary memory 19 is rewritable this one becomes available again after the copying of the new songs for storing in it with a supplying step 24 other new songs providing from an external memory 25.

The FIG. 5 shows an organization chart of a method for arranging sets of data C1, C2, C3, . . . ,CN contained in a mass memory. Prior to the arrangement the sets of data are arranged sequentially in an order [C1,C2, C3, . . . ,CN] shown in 26A. After obtaining of the classified list 17 a step of arranging arranges the sets of data in the mass memory according to the predetermined order of hierarchy used in the classified list 17. Following the example of classification of the sets in a decreasing order of their listening frequency as described here above, the sets of data are arranged in the order [C1,C2, C3, . . . ,Cx] as shown by 26B.

The FIG. 6 schematically shows a device for an adaptive selection used together with a player/recorder 28 of magnetic tape 29. The magnetic tape 29 is used as a sequential and rewritable information carrier for a mass memory 30 and an administration memory 31. Sets of data, for example songs, are stored in the mass memory 30. The player/recorder 28 is activated by a microprocessor 32 to read a song from the magnetic tape 29. The song read in this way is transmitted to reproduction means 33 allowing to reproduce the song as audio signals.

Administration information comprising for example predetermined information and parametrical information is modified by the microprocessor 28 at least each time that a song is modified, erased or read. In an advantageous embodiment the microprocessor 32 copies the administration information from the administration memory 31 into a random access memory 34 prior to reading one or a plurality of songs. This way the microprocessor 32 may at any time modify predetermined and/or parametrical administration information in the random access memory 34 independently of the reading by the player/recorder 28 of the mass memory 30. The microprocessor 32 periodically stores the modified administration information into the administration memory into the administration memory 31 notably when the player/recorder 28 is not reading songs, and this way updates the outdated administration information. The administration information copied into the random access memory 34 may also be modified following an intervention of a user 35 on the microprocessor 32 using appropriate command or selection means (not shown).

The microprocessor 32 may use a clock and/or a calendar (not shown) as a source of administration information by converting a listening time and date into parametrical information.

Furthermore the microprocessor 32 evaluates the administration information according to one or many predetermined criteria for example after each reading of a song or each time that this is required depending on the needs of the user 35. The one or many predetermined criteria may be default criteria which the microprocessor 32 automatically applies or also criteria which the user 35 selects using selection means (not shown). The microprocessor 32 for example reads the administration information out of memory 34, performs an evaluation of this administration information according to one or many predetermined criteria and memorizes the adaptive selection of songs corresponding to the evaluated administration information by storing it into the random access memory 34.

According to an advantageous embodiment of the device the microprocessor 32 classifies the songs of the adaptive selection according to a hierarchical order which may be default or imposed by the user 35, and stores into the random access memory 34 a classified list of the songs.

Following a command of the user 35, the microprocessor 32 activates the player/recorder 28 such that the songs of the adaptive selection or out of the classified list are reproduced from the mass memory 30 by the reproduction means 33.

According to an advantageous embodiment of the device according to the invention the magnetic tape 29 is also a carrier for the temporary memory 36. The user 35 may choose to temporarily record new songs into the temporary memory 36 by copying these for example from the optical disk/reader combination 37. New administration information to administrate the new songs is added into the administration memory 31 and/or into the random access memory 34 through the microprocessor 32. The microprocessor 32 modifies the new administration information notably when a new song is read from the temporary memory 36 or when the content of the temporary memory 36 is modified, and stores the modified new administration information into the random access memory 34 and/or into the administration memory 31. The microprocessor 32 evaluates for example periodically according to one or many predetermined criteria of interest the new administration information such to obtain an actual selection of new songs. The actual selection is stored into the random access memory 34 by the microprocessor 32. It is used by the microprocessor 32 for transferring purposes. Indeed the microprocessor may activate the player/recorder 32 to copy the new songs from the actual selection from the temporary memory 36 into the mass memory 30 and to erase the new songs copied from the temporary memory 36. The random access memory 34 may also be used as buffer memory during the copy of new songs.

In an embodiment of the device according to the invention the magnetic tape may carry a plurality of administration memories (not shown). The user 35 chooses an administration memory through the microprocessor 32 by for example identifying himself/herself. The chosen administration memory contains parametrical information reflecting his/her listening behavior of the songs.

In an advantageous embodiment of the device shown in FIG. 6 the songs are sequentially stored in the mass memory 30 and the microprocessor 32 uses the classified list stored in the random access memory 34 to determine a new arrangement of the songs in the mass memory. The microprocessor 32 initiates the copying of the songs concerned by the new arrangement of the mass memory into a reorganization memory which may for example be the random access memory 34, and then copies these songs in a sequential order according to the classified list from the reorganization memory into the mass memory. In general a time of access for reading with the newly arranged sets in the mass memory is improved as compared to the initial arrangement of these songs.

What is claimed is:

1. A method for managing sets of data in a mass memory, comprising the steps of:

reading a set of data of a temporary memory in response to user selection of the set of data;

modifying administration information associated with said set of data as a consequence of said reading;

storing the modified administration information in an administration memory;

evaluating at least part of the administration information and obtaining a selection of sets of data based on said evaluating; and transferring said selection from the temporary memory to the mass memory.

2. The method of claim 1, wherein the mass memory, the temporary memory and the administration memory are on the same information carrier.

3. The method of claim 1, wherein the mass memory is on a sequential information carrier.

4. The method of claim 3, wherein the sequential information carrier is a magnetic tape.

5. The method of claim 1, wherein the temporary memory is rewritable.

6. A device, comprising:
   a mass memory;
   a temporary memory containing sets of data;
   an administration memory;
   means for reading a set of data of the temporary memory in response to user selection of the set of data;
   means for modifying administration information associated with said set of data as a consequence of said reading;
   means for storing the modified administration information in the administration memory;
   evaluating means for evaluating at least part of the administration information in order to obtain a selection of sets of data based on said evaluating; and
   transferring means for copying said selection from the temporary memory to the mass memory.

7. The device of claim 6, wherein the mass memory, the temporary memory and the administration memory are on the same information carrier.

8. The device of claim 6, wherein the mass memory is on a sequential information carrier.

9. The device of claim 8, wherein the sequential information carrier is a magnetic tape.

10. The device of claim 6, wherein the temporary memory is rewritable.

* * * * *